United States Patent Office 3,316,275
Patented Apr. 25, 1967

3,316,275
CHRYSANTHEMUM CARBOXYLIC ACID ESTERS
Takeaki Kato and Kenzo Ueda, Nishinomiya-shi, Sadao Horie, Suita-shi, Toshio Mizutani, Amagasaki-shi, Keimei Fujimoto, Minoo-shi, and Yositosi Okuno, Nishinomiya-shi, Japan, assignors to Sumitomo Chemical Company, Ltd., Osaka, Japan, a corporation of Japan
No Drawing. Filed Dec. 1, 1964, Ser. No. 415,175
Claims priority, application Japan, Dec. 3, 1963, 38/65,180; Dec. 4, 1963, 38/65,467; Dec. 5, 1963, 38/65,622; Dec. 10, 1963, 38/66,803, 38/66,804; Dec. 17, 1963, 38/68,215; Dec. 19, 1963, 38/68,673
8 Claims. (Cl. 260—326)

This invention relates to novel chrysanthemum carboxylic acid esters, to a process for preparing the same, and to insecticidal compositions containing the same. More particularly, it relates to novel chrysanthemum carboxylic acid esters having the general formula,

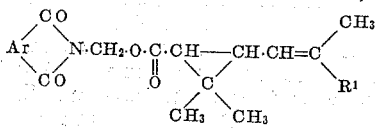

wherein Ar is a member selected from the group consisting of (1) 3,4-dihydro-1,2-naphthylene radicals of the general formula,

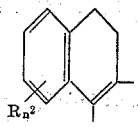

wherein $R^2$ is a member selected from the group consisting of methyl and methoxy radicals, and $n$ is an integer of 0 to 2, and (2) 1,2-naphthylene radical of the formula,

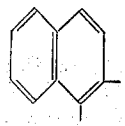

and $R^1$ is a member selected from the group consisting of methyl and methoxycarbonyl radicals, to a process for preparing the same, and to insecticidal compositions containing the same.

It is one object of the present invention to provide a novel group of chrysanthemum carboxylic acid esters, which have strong insecticidal activities to house and agricultural insects with low toxicities to warm-blooded animals and plants, and which can be commercially produced in low cost. Another object is to provide a process for preparing such novel esters by a commercially available procedure. Still another object is to provide insecticidal compositions containing such an ester. Other objects would be obvious from the following description.

As an insecticide utilizable with safety because of the harmlessness to warm-blooded animals, pyrethrum extract has long been employed. Recently, allethrin which is an analog of the effective ingredients in pyrethrum extract, i.e. pyrethrin and cinerin, was synthesized and developed for insecticidal uses. These ingredients are surely valuable in their high insecticidal powers, especially in their rapid effect to insects, and in the characteristics of permitting no, or little, resistivity to insects. However, their uses are limited to some extent because of their complicated steps of the production and their great expense for the production.

The present inventors have made broad researches on the various chrysanthemum carboxylic acid esters, and have now found the present novel group of chrysanthemum carboxylic acid esters, which possess significant insecticidal power but are harmless to warm-blooded animals, and which can be prepared from easily available materials by a simple process with low prices. In other words, the present compounds are 3,4-dihydronaphthalene-1,2-dicarboximidomethyl and naphthalene-1,2-dicarboximidomethyl esters of chrysanthemum carboxylic acids. Accordingly, it is a feature of the present invention that the characteristics of the present compounds resemble to pyrethrin, cinerin and allethrin, even though the alcohol moieties of the former are extremely simple as compared to those of the latter and are composed of carbon, hydrogen, oxygen, and nitrogen atoms, unlike the latter composed of carbon, hydrogen and oxygen.

Thus, the present invention is to provide novel chrysanthemum carboxylic acid esters having the formula,

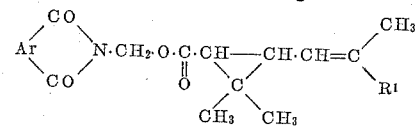

wherein Ar and $R^1$ have the same meanings as identified above, and to provide a process for preparing such compounds, comprising esterifying a 3,4-dihydronaphthalene-1,2-dicarboximide or naphthalene-1,2-dicarboximide compound having the general formula,

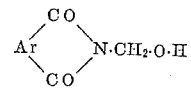

wherein Ar has the same meaning as identified above, with a chrysanthemum carboxylic acid having the general formula,

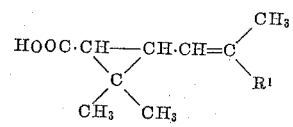

wherein $R^1$ has the same meaning as identified above, according to the general esterifying procedure.

The naphthalene-1,2-dicarboximide compounds employed in the present invention, in other words, N-(hydroxymethyl)-3,4-dihydronaphthalene-1,2-dicarboximides and N-(hydroxymethyl)-naphthalene-1,2-dicarboximide may be prepared from 3,4-dihydronaphthalene-1,2-dicarboxylic anhydride, its imide compound, or their nucleus-substituted compounds, and naphthalene-1,2-dicarboxylic anhydride and its imide compound, according to the conventional procedures well-known to those skilled in the art. For instance, N-(hydroxymethyl)-3,4-dihydronaphthalene-1,2-dicarboximide may be prepared by reaction of 3,4-dihydronaphthalene-1,2-dicarboximide with formaldehyde or its low molecular weight polymer according to the conventional methylolation conditions in the presence or absence of an alkaline catalyst, such as sodium hydroxide and potassium carbonate, in a solvent, such as water, alcohol, benzene, and toluene.

Similarly, various N-(hydroxymethyl)-3,4-dihydronaphthalene-1,2-dicarboximides, such as N-(hydroxymethyl) - 3,4-dihydro-7-methyl-naphthalene-1,2-dicarboximide, N - (hydroxymethyl)-3,4-dihydro-6,7-dimethyl-naphthalene-1,2-dicarboximide, (N-hydroxymethyl)-3,4-dihydro - 7 - methoxynaphthalene-1,2-dicarboximide, and the like compounds and N-(hydroxymethyl)-naphthalene-1,2-dicarboximide may be prepared.

The chrysanthemum carboxylic acid employed in the present invention is either chrysanthemic acid (chrysanthemum monocarboxylic acid; $R^1$ being $CH_3$) or pyrethric acid ($R^1$ being $COOCH_3$, a monomethyl ester of chrysanthemum dicarboxylic acid). They are the acidic moieties of pyrethrin, cinerin and allethrin, and can be synthesized according to the known method.

The esterification reaction of the present invention may be effected in various ways. The naphthalene-1,2-dicarboximide compound may be heated with the chrysanthemum carboxylic acid in the presence of a strong acid, such as aromatic sulfonic acid and sulfuric acid, in an organic solvent capable of azeotropically boiling with water, thereby to remove the water formed in the esterification, out of the reaction system. It may also be heated with a lower alkyl ester of the chrysanthemum carboxylic acid in the presence of a basic catalyst, such as sodium, potassium, sodium alcoholate and potassium alcoholate, thereby to continuously remove the lower alcohol formed through the transesterification out of the reaction system. In such case, methyl, ethyl, n-propyl and isopropyl esters are suitable. In the most preferable esterification, it may be treated with the chrysanthemum carboxylic acid halide in an inert organic solvent, preferably in the presence of a de-hydrogen halide agent, such as pyridine, triethylamine and other tertiary amine, whereby the esterification is proceeded with the isolation of a hydrohalic acid salt within a short period of time. In this case, the acid chloride is the most preferable, though the bromide and the iodide may be employable. Further, it may be refluxed with the chrysanthemum carboxylic acid anhydride in an inert solvent for several hours, thereby to yield the objective ester and free chrysanthemum carboxylic acid, the latter being recovered and again converted to the anhydride by treatment with, for example acetic anhydride for reuse. Alternatively, the naphthalene-1,2-dicarboximide compound may be employed for the esterification by once converting to the form of the halide having the general formula,

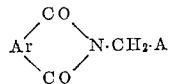

wherein Ar has the same meaning as identified above, and A means a halogen atom, by treatment with thionyl chloride or phosphorus trichloride etc. In this case, the halide may be heated with an alkali metal or ammonium salt of the chrysanthemum carboxylic acid in an inert solvent, thereby to yield the objective ester with the isolation of an alkali metal or ammonium halide salt. Alternatively, the halide may be heated with the free acid in an inert solvent in the presence of a dehydrogen halide agent, such as tertiary amines. In the formula, A may be any of chlorine, bromine, and iodine, among which the former two are preferable and practical. As the alkali metals, sodium and potassium are preferable.

As well-known, the chrysanthemum carboxylic acid as identified above comprises various stereoisomers and optical isomers. It is needless to say that the acid and the derivatives thereof as described herein involve their isomers.

The process of the present invention is described in more detail with reference to the following examples, which are however to be construed for the purpose of illustration and not of the limitation.

EXAMPLE 1

Twenty two point nine grams of N-(hydroxymethyl)-3,4-dihydronaphthalene-1,2-dicarboximide was dissolved in a mixture of 60 ml. of dry toluene and 30 g. of dry pyridine. A solution of 19.2 g. of trans-chrysanthemoyl chloride in 50 ml. of dry toluene was dropped to the mixture while being stirred. The reaction vessel was tightly closed and allowed to sand overnight at room temperature. The excessive pyridine was neutralized with 10% hydrochloric acid, and the resulting two layers were separated from each other. The organic layer was washed with a saturated sodium bicarbonate solution and then with a saturated sodium chloride solution, and dried over sodium sulfate. The solution was purified by passing through an alumina column.

Evaporation of the solvent in vacuo and recrystallization of the residue from toluene yielded 32.5 g. of N-(chrysanthemoxy-methyl) - 3,4 - dihydronaphthalene-1,2-dicarboximide, M.P. 130°–136° C.

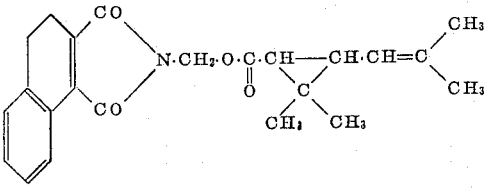

*Analysis.*—Found: C, 73.03; H, 6.54; N, 3.70%. Calculated (as $C_{23}H_{25}NO_4$): C, 72.80; H, 6.64; N, 3.69%.

EXAMPLE 2

A mixture of 24.3 g. of N-(hydroxymethyl)-3,4-dihydro-7-methyl-naphthalene-1,2-dicarboximide, 32 g. of chrysanthemic acid (a mixture of cis- and transisomers) anhydride and 80 g. of dry xylene was refluxed for 3 hours, and the reaction mass was washed with an aqueous 3% sodium hydroxide solution at a temperature below 10° C., thereby to remove the by-produced chrysanthemic acid. The reaction mass was then washed with a saturated sodium chloride solution, dried on sodium sulfate, and passed through an alumina column for purification.

Evaporation of the solvent in vacuo and recrystallization of the residue from toluene yielded 33.8 g. of N-(chrysanthemoxymethyl) - 3,4 - dihydro-7-methylnaphthalene 1,2-dicarboximide, M.P. 134–141° C.

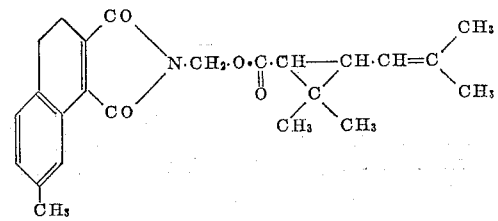

*Analysis.*—Found: C, 73.18; H, 6.99; N, 3.61%. Calculated (as $C_{24}H_{27}NO_4$): C, 73.26; H, 6.92; N, 3.56%.

EXAMPLE 3

Twenty seven point six grams of N-(chloromethyl)-3,4-dihydro-6,7-dimethylnaphthalene-1,2-dicarboximide, 16.8 g. of trans-chrysanthemic acid and 12 g. of triethylamine were dissolved in 200 ml. of dry acetone, and refluxed for 5 hours, while being stirred. After the reaction, the precipitated triethylamine hydrochloride was separated from the reaction mixture by filtration and washed with acetone. Filtrate was added with washings and evaporated in vacuo to remove the solvent, and the residue was dissolved in toluene. The solution was washed with water and dried over sodium sulfate and passed through an alumina column for purification. Evaporation of the solvent in vacuo and recrystallization of the residue from toluene yielded 35.8 g. of N-(chrysanthemoxymethyl)-3,4-dihydro-6,7-dimethylnaphthalene-1,2-dicarboximide, M.P. 139–143° C.

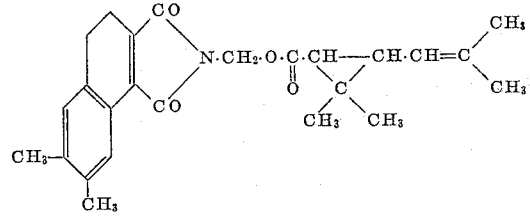

*Analysis.*—Found: C, 73.73; H, 7.16; N, 3.50%. Calculated (as $C_{25}H_{29}NO_4$): C, 73.68; H, 7.17; N, 3.44%.

EXAMPLE 4

In similar way as described in Example 1, 25.9 g. of N-(hydroxymethyl) - 3,4 - dihydro - 7 - methoxynaphthalene-1,2-dicarboximide was allowed to react with 19.2 g. of cis-trans-chrysanthemoylchloride to yield 36.3 g. of N-(chrysanthemoxymethyl) - 3,4 - dihydro - 7 - methoxy-naphthalene-1,2-dicarboximide, pale yellow viscous liquid.

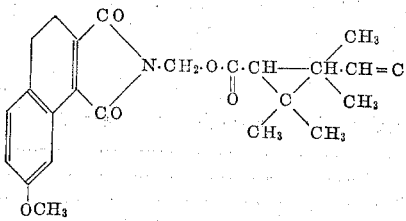

*Analysis.*—Found: C, 70.34; H, 6.68; N, 3.46%. Calculated (as $C_{24}H_{27}NO_5$): C, 70.40; H, 6.65; N, 3.42%.

EXAMPLE 5

In similar way as described in Example 1, 22.7 g. of N - (hydroxymethyl)-naphthalene-1,2-dicarboximide was allowed to react with 19.2 g. of cis-trans-chrysanthemoyl chloride to yield 31.7 g. of N-(chrysanthemoxymethyl)-naphthalene-1,2-dicarboximide, M.P. 127–137° C.

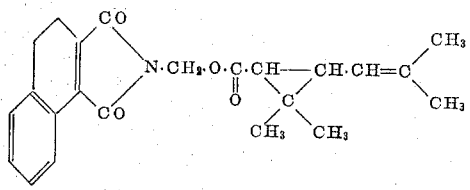

*Analysis.*—Found: C, 72.98; H, 6.12; N, 3.78%. Calculated (as $C_{23}H_{23}NO_4$): C, 73.19; H, 6.14; N, 3.71%.

EXAMPLE 6

In similar way as described in Example 3, 24.6 g. of N-(chloromethyl)-naphthalene-1,2-dicarboximide was allowed to react with 16.8 g. of trans-chrysanthemic acid to yield 29.8 g. of N-(chrysanthemoxymethyl)-napththalene-1,2-dicarboximide, M.P. 136–139° C.

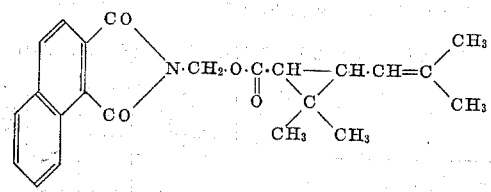

EXAMPLE 7

In similar way as described in Example 1, 0.1 mole of N - (hydroxymethyl) - 3,4 - dihydronaphthalene-1,2-dicarboximide was allowed to react with 23.5 g. (0.102 mol) of pyrethroyl chloride to yield N-(pyrethroxymethyl) - 3,4 - dihydronaphthalene - 1,2-dicarboximide, in 87.5% yield.

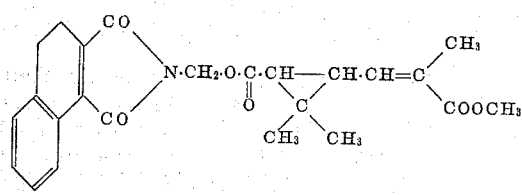

*Analysis.*—Found: C, 68.11; H, 5.98; N, 3.28%. Calculated (as $C_{24}H_{25}NO_6$): C, 68.07; H, 5.95; N, 3.31%.

EXAMPLE 8

In similar way as described in Example 2, 0.1 mole of N - (hydroxymethyl) - 7 - methyl - 3,4 - dihydronaphthalene-1,2-dicarboximide was allowed to react with 0.1 mole of pyrethric acid anhydride to yield N-(pyrethroxymethyl) - 7 - methyl - 3,4-dihydronaphthalene-1,2-dicarboximide, in 80.5% yield.

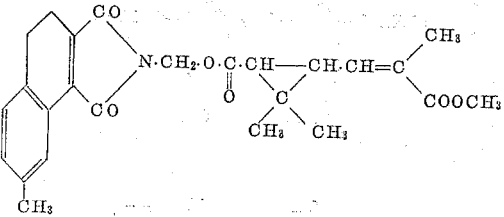

*Analysis.*—Found: C, 68.51; H, 6.38; N, 3.17%. Calculated (as $C_{25}H_{27}NO_6$): C, 68.63; H, 6.22; N, 3.20%.

As mentioned above, the present esters possess superior insecticidal power, and exhibit rapid knock down and excellent killing effect to house flies, mosquitoes, cockroaches, etc. Moreover, these esters are especially useful for sanitary and domestic purposes, because of their rapid effectiveness and harmlessness.

The present esters are suitably employed for the preparation of insecticidal compositions which have broad uses, correlatively with the low cost.

For the formulation of the insecticidal composition containing the present compound as the essential active ingredient, oil solution, emulsifiable concentrate, wettable powder, dust, aerosol, mosquito coil, bait and other preparations, may be formulated using the generally employed carriers, diluents or auxiliary agents, according to the method known to those skilled in the art in the cases of the formulation of pyrethrum extract and allethrin. If the compound is crystalline, it is preferably employed as a preliminarily prepared solution in an organic solvent, such as acetone, xylene, methylnapthalene, etc., depending upon the type of the formulation.

If desired, the present esters may be employed for the preparation of the insecticidal compositions in combination with other insecticidal component, such as pyrethroide, for example, pyrethrum extract and allethrin, organo-chlorine and organophosphorous compounds, synergistic agent for pyrethroide, for example, piperonyl butoxide, piperonyl sulfoxide, β-butoxy-β'-thiocyanodiethyl ether and the like. By combination with such other ingredient, the present insecticidal composition can be adapted to broader uses with more increased effect.

Concretely speaking, the present esters may be blended with at least one of pyrethrin, allethrin, O,O,-dimethyl-O-(3-methyl-4-nitrophenyl) thiophosphate, malathion, diazinone, dimethoate, γ-BHC, and others, to yield a pesticidal composition which possesses high insecticidal activity with rapid effectivity. In such cases, the both components may be blended in a broad range of proportions, for example, in ratio of 0.05:1 to 1:0.05 by weight of the ester to another insecticidal component.

The present esters are comparatively stable. However, if the present esters are intended to be stored under a severe condition for a long period of time, they may preferably be added with a small amount of a stabilizer, for example, alkylphenol compounds such as those having the fomula (1) 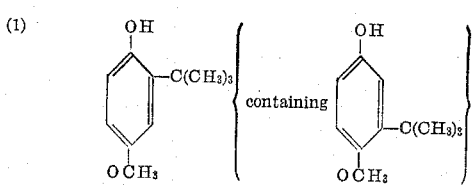

(2) 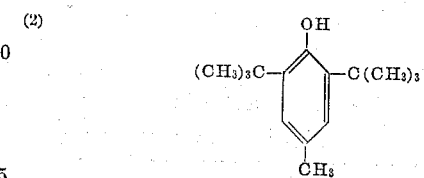

3)

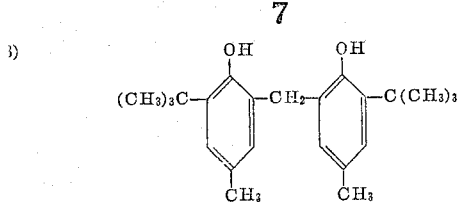

4)

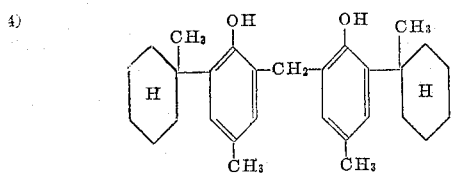

The amount of the stabilizer, if added, may be less than 1% by weight of the present ester, ordinarily from 1 to 0.1%.

The following are the illustrations of the insecticidal compositions containing the chrysanthemum carboxylic acid esters according to the invention and of the insecticidal activities.

EXAMPLE 9

A solution of 0.5 g. of N-(chrysanthemoxymethyl)-3,4-dihydro-naphthalene-1,2-dicarboximide in 5 g. of xylene was diluted with a refined kerosene to make the volume 100 ml., whereby 0.5% oil preparation was obtained.

In a glass box of 70 cm. cube, about 30 house flies (adult) were liberated, and 0.3 ml. of the thus-prepared 0.5% oil preparation was uniformly sprayed with an atomizer into the box. Knock-down number of the house flies according to the lapse of time were observed. Similarly, a 0.3% oil preparation containing allethrin was tested for comparison.

KNOCK-DOWN RATIO OF HOUSE FLIES ACCORDING TO THE LAPSE OF TIME (PERCENT)

|  | 30 sec. | 1 min. | 2 min. | 4 min. | 8 min. | 11½ min. |
|---|---|---|---|---|---|---|
| The present compound (0.5%) | 2.3 | 27.7 | 40.8 | 61.3 | 79.5 | 87.8 |
| Allethrin oil preparation (0.3%) | 6.9 | 26.4 | 43.3 | 62.9 | 75.2 | 88.9 |

EXAMPLE 10

A solution of 1 g. of N-(chrysanthemoxymethyl)-3,4-dihydro-7-methylnaphthalene-1,2-dicarboximide in 20 g. of xylene was diluted with a refined kerosene to make the volume 100 ml., whereby 1% oil preparation was obtained.

By metal turn-table method (Campbell, F. L., Sullivan, W. N., Soap and Sanit. Chemicals, vol. 14, No. 6, p. 119, 1938), each 5 ml. of the 1% oil preparation or that diluted with a refined kerosene was sprayed to about 100 house flies (adult) within 10 seconds. After 20 seconds, the shutter was opened and the house flies were allowed to expose to the sprayed mist for 10 minutes. Then, the house flies were transferred to a cage, and the knockdown number was counted. After 24 hours, kill number was also observed.

Concentration of the ingredient (percent): Mortality (percent)
1.0 ----------------------------------- 91.4
0.5 ----------------------------------- 41.1
0.25 ---------------------------------- 18.7

EXAMPLE 11

A solution of 1 g. of N-(chrysanthemoxymethyl)-3,4-dihydro-6,7-dimethylnaphthalene-1,2-dicarboximide in 30 g. of methylnaphthalene was diluted with a refined kerosene to make the volume 100 ml., whereby 1% oil preparation was obtained.

In similar way as described in Example 10, the resulting 1% oil preparation or that diluted with a refined kerosene was tested.

Concentration of the ingredient (percent): Mortality (percent)
1.0 ----------------------------------- 91.5
0.5 ----------------------------------- 78.2
0.25 ---------------------------------- 17.9

EXAMPLE 12

An emulsifiable concentrate was obtained by uniformly mixing 15 g. of N-(chrysanthemoxymethyl)-3,4-dihydro-7-methoxynaphthalene-1,2-dicarboximide, 75 g. of xylene and 10 g. of Sorpol SM–200 (a surface active agent, trade named of Toho Chemical Co., Ltd.).

The resulting 15% emulsifiable concentrate was diluted with 10 times by weight of water, and 10 ml. was sprayed onto house flies (adult) in a settling-tower (McCallan, S. E. A., Wellman, R. H., Contributions of Boyce Thompson, Inst. Vol. 12, p. 451, 1942) within 10 seconds. After 5 seconds, the shutter was opened and the house flies were exposed to the sprayed mist for 10 minutes and then taken out from the settling tower. The house flies were kept at a constant temperature, and the mortality was examined after 20 hours.

The mortality was higher than 90%.

EXAMPLE 13

A solution of 0.5 g. of N-(chrysanthemoxymethyl)-naphthalene-1,2-dicarboximide in 20 g. of methylnaphthalene was diluted with a kerosene to make the volume 100 ml., whereby 0.5% oil preparation was obtained.

In similar way as described in Example 9, the resulting 0.5% oil preparation was tested.

KNOCK-DOWN RATIO OF HOUSE FLIES ACCORDING TO THE LAPSE OF TIME (PERCENT)

|  | 30 sec. | 1 min. | 2 min. | 4 min. | 8 min. | 11½ min. |
|---|---|---|---|---|---|---|
| The present compound (0.5%) | 2.4 | 25.9 | 49.4 | 66.4 | 79.2 | 88.4 |
| Allethrin oil preparation (0.3%) | 0.8 | 28.5 | 46.2 | 71.9 | 82.9 | 90.1 |

EXAMPLE 14

An emulsifiable concentrate was obtained by uniformly mixing 5 g. of N-(chrysanthemoxymethyl)-naphthalene-1,2-dicarboximide, 90 g. of xylene and 5 g. of Sorpol SM–200 (a surface active agent, trade name of Toho Chemical Co., Ltd.).

The resulting 5% emusifiable concentrate was diluted with 10 times by weight of water, and 15 ml. was sprayed onto house flies (adult) in a settling-tower within 15 seconds. After 5 seconds, the shutter was opened and the house flies were exposed to the sprayed mist for 10 minutes and then taken out from the settling-tower. The house flies were kept at a constant temperature of 27° C., and the mortality was examined after 24 hours. The mortality was higher than 90%.

EXAMPLE 15

In similar way as described in Example 10, the oil preparations of the compounds shown in the following table were tested.

| Compound | Concentration of the ingredient (percent) | Knock-down ratio of house flies (after 10 minutes) (percent) | Mortality of house flies (after 24 hours) (percent) |
|---|---|---|---|
| N-(pyrethroxymethyl)-3,4-dihydro-naphthalene-1,2-dicarboximide | 0.5 | 100 | 94.5 |
| N-(pyrethroxymethyl)-7-methyl-3,4-dihydronaphthalene-1,2-dicarboximide | 1.0 | 100 | 91.4 |
| N-(pyrethroxymethyl)-6,7-dimethyl-3,4-dihydronaphthalene-1,2-dicarboximide | 1.0 | 100 | 91.5 |

EXAMPLE 16

A solution of 1.5 g. of N-(pyrethroxymethyl)-6,7-dimethyl-3,4-dihydronaphthalene-1,2-dicarboximide in 40 g. of acetone was well mixed with 98.5 g. of 200 mesh talc in a mortar, and the acetone was evaporated from the mixture to leave 1.5% dust preparation.

About 50 house flies (adult) were put in a deep dish and covered with a wire netting, which was then set at the bottom of the settling tower.

One gram of the resulting dust preparation was sprayed upwardly at a pressure of 20 lbs./inch². After 10 seconds, the shutter was opened and the house flies were exposed to the falling sprayed powder for 10 minutes and then taken out from the tower. The house flies were kept at a constant temperature of 27° C. and the mortality was examined after 24 hours. The mortality was higher than 90%.

What we claim is:

1. A chrysanthemum carboxylic acid ester having the formula,

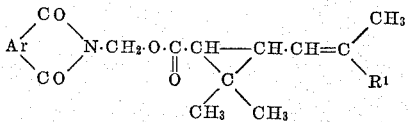

wherein Ar is a member selected from the group consisting of (1) 3,4-dihydro-1,2-naphthylene of the formula,

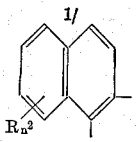

wherein $R^2$ is a member selected from the group consisting of methyl and methoxy, and $n$ is an integer of 0 to 2, and (2) 1,2-naphthylene of the formula,

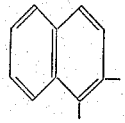

and $R^1$ is a member selected from the group consisting of methyl and methoxy carbonyl.

2. N - (chrysanthemoxymethyl) - 3,4 - dihydro-naphthalene-1,2-dicarboximide.
3. N - (chrysanthemoxymethyl) - 3,4 - dihydro - 7-methyl-naphthalene-1,2-dicarboximide.
4. N - (chrysanthemoxymethyl) - 3,4 - dihydro - 6,7-dimethylnaphthalene-1,2-dicarboximide.
5. N - (chrysanthemoxymethyl) - 3,4 - dihydro - 7-methoxynaphthalene-1,2-dicarboximide.
6. N - (chrysanthemoxymethyl) - naphthalene - 1,2-dicarboximide.
7. N - (pyrethroxymethyl) - 3,4 - dihydronaphthalene-1,2-dicarboximide.
8. N - (pyrethroxymethyl) - 7 - methyl - 3,4 - dihydro-naphthalene-1,2-dicarboximide.

References Cited by the Examiner

UNITED STATES PATENTS 3,127,413    3/1964    Gray _____ 260—319

OTHER REFERENCES

Fieser et al., Advanced Organic Chemistry, New York, Reinhold Publishing Corp., 1961 pp. 370–372.

Nefkens, Nature, vol. 193, 1962, pp. 974–975.

ALEX MAZEL, *Primary Examiner.*

MARY U. O'BRIEN, *Assistant Examiner.*